(12) United States Patent
Cui

(10) Patent No.: US 11,912,175 B2
(45) Date of Patent: Feb. 27, 2024

(54) HEADREST HEIGHT ADJUSTMENT MECHANISM AND CHILD SAFETY SEAT

(71) Applicant: WONDERLAND SWITZERLAND AG, Steinhausen (CH)

(72) Inventor: Zongwang Cui, Steinhausen (CH)

(73) Assignee: WONDERLAND SWITZERLAND AG, Steinhausen (CH)

(*) Notice: Subject to any disclaimer, the term of this patent is extended or adjusted under 35 U.S.C. 154(b) by 0 days.

(21) Appl. No.: 17/540,844

(22) Filed: Dec. 2, 2021

(65) Prior Publication Data

US 2022/0176854 A1    Jun. 9, 2022

(30) Foreign Application Priority Data

Dec. 3, 2020 (CN) .......................... 202011411191.2

(51) Int. Cl.
| | |
|---|---|
| *B60N 2/28* | (2006.01) |
| *B60N 2/829* | (2018.01) |
| *B60N 2/818* | (2018.01) |
| *B60N 2/815* | (2018.01) |

(52) U.S. Cl.
CPC ............ *B60N 2/2851* (2013.01); *B60N 2/818* (2018.02); *B60N 2/829* (2018.02); *B60N 2/815* (2018.02)

(58) Field of Classification Search
CPC .................................................. B60N 2/2851
See application file for complete search history.

(56) References Cited

U.S. PATENT DOCUMENTS

| | | | | |
|---|---|---|---|---|
| 6,491,348 B1* | 12/2002 | Kain | .................... | B60N 2/2821 297/484 |
| 7,246,852 B2* | 7/2007 | Balensiefer | .......... | B60N 2/2872 297/410 |
| 8,573,693 B2* | 11/2013 | Gaudreau, Jr. | ...... | B60N 2/2821 297/250.1 |

(Continued)

FOREIGN PATENT DOCUMENTS

| | | |
|---|---|---|
| CN | 102602310 A | 7/2012 |
| CN | 202448776 U | 9/2012 |

(Continued)

OTHER PUBLICATIONS

Suzuki H, WO-2015025427-A1, Feb. 2015, text translation (Year: 2015).*

(Continued)

*Primary Examiner* — David R Dunn
*Assistant Examiner* — Tania Abraham
(74) *Attorney, Agent, or Firm* — HAUPTMAN HAM, LLP

(57) ABSTRACT

A headrest height adjustment mechanism connected to a slider fixed to a headrest, comprising: an integral engaging member, for positioning the headrest; a connecting member, a first end of the connecting member is pivotally connected to the slider, and the second end of the connecting member is connected to the engaging member; an operating member, connected to the engaging member to operate the engaging member; and an elastic member, abutted between the connecting member and the slider. The headrest height adjustment mechanism according to the application can adjust the height of the headrest in a simpler and effective manner, and has reliable locking and low cost.

14 Claims, 4 Drawing Sheets

(56) References Cited

U.S. PATENT DOCUMENTS

| | | | | |
|---|---|---|---|---|
| 8,622,476 B2* | 1/2014 | Karremans | ......... | B60N 2/2812 |
| | | | | 297/410 |
| 2002/0043837 A1* | 4/2002 | Kain | .................... | B60N 2/2821 |
| | | | | 297/250.1 |
| 2012/0181829 A1* | 7/2012 | Williams | ............. | B60N 2/2806 |
| | | | | 297/250.1 |
| 2021/0061150 A1* | 3/2021 | Mo | ...................... | B60N 2/2821 |
| 2022/0111776 A1* | 4/2022 | Mo | ........................ | B60N 2/286 |

FOREIGN PATENT DOCUMENTS

| | | | | |
|---|---|---|---|---|
| CN | 103568890 A | 2/2014 | | |
| CN | 203601063 U | 5/2014 | | |
| CN | 103895537 A | 7/2014 | | |
| CN | 203681324 U | 7/2014 | | |
| CN | 210062756 U | 2/2020 | | |
| CN | 111452684 A | 7/2020 | | |
| DE | 102021211535 A1 | 4/2022 | | |
| WO | WO-2015025427 A1 * | 2/2015 | ........... | B60N 2/2821 |

OTHER PUBLICATIONS

Chinese Search Report issued in corresponding Chinese Application No. 202011411191.2, pp. 1-17.

Chinese Search Report issued in corresponding Chinese Application No. 202011411191.2, dated Nov. 2, 2020, pp. 1-14.

German 1st Office Action issued in corresponding German Application No. 102021131380.5, dated Apr. 28, 2023, pp. 1-6.

* cited by examiner

HEADREST HEIGHT ADJUSTMENT MECHANISM AND CHILD SAFETY SEAT

TECHNICAL FIELD

The disclosure relates to a headrest height adjustment mechanism and a child safety seat comprising the same.

BACKGROUND

A child safety seat is a device specially designed for children of different weights or ages. Children will be restrained in the safety seats during travelling, so in the case of a car collision or sudden deceleration, the impact on them can be reduced and movement of their bodies can be restricted, thus safety of children in travelling can be effectively improved. At present, most of the child safety seats on the market have the function of adjusting the height of the headrest to meet the needs of children of different ages and sizes.

There are many designs of headrest height adjustment mechanisms in the related art. For example, a child seat has been proposed which includes a headrest height adjustment mechanism for adjusting the height of the headrest. The headrest height adjustment mechanism includes a support frame, a driving member, and an engaging member. The headrest is fixed on the support frame, and both sides of the support frame are slidably connected to the backrest tube. The engaging member is slidably is slidably arranged in the support frame, and has one end connected to the support frame and other end selectively and engagingly connected to the backrest tube at multiple positions. The driving member may be operated to bring the engaging member to separate from the engagement with the backrest tube, so as to achieve the height adjustment of the headrest.

As another example, another child seat includes an adjustment mechanism. The adjustment mechanism includes an operating member and an engaging member. The operating member is movably arranged on the headrest, and the engaging member is connected to the operating member and can rotatably lock the sliding of the headrest. The backrest is provided with at least two engaging parts along the sliding direction of the headrest, and the engaging member can be selectively engage one of the engaging parts. The operating member may drive the engaging member to be separated from the engagement of the engaging part, such that the headrest slides in the up and down direction.

However, all of the headrest height adjustment mechanisms proposed in the related art have the problem of complicated structure. Moreover, in all of the headrest height adjustment mechanisms proposed in the related art, the headrest height adjustment is performed by changing the length of the engaging part in a direction perpendicular to the sliding direction, that is, for the left and right sides, it is necessary to arrange two engaging parts, and to lock and unlock the two engaging parts by changing a spacing between them in a direction perpendicular to the sliding direction. Therefore, problems of complex structure and high cost have to be solved. In addition, it is necessary to simultaneously operate the left and right engagement members to change the distance between them to lock and unlock the headrest, so the operation is complicated, and the problems of unreliable locking and incomplete unlocking are prone to occur.

SUMMARY

The application provides a headrest height adjustment mechanism and a child safety seat comprising the headrest height adjustment mechanism, which can adjust the height of the headrest in a simpler and more effective manner with a reliable locking and a low cost.

According to a solution of the application, a headrest height adjustment mechanism connected to a slider fixed to a headrest is provided. The headrest height adjustment mechanism comprises: an integral engaging member, positioning the headrest; a connecting member, an end of the connecting member is pivotally connected to the slider, and the other end of the connecting member is connected to the engaging member; an operating member, connected to the engaging member to operate the engaging member; and an elastic member, abutted between the connecting member and the slider.

Preferably, the engaging member is integral rod-shaped.

Preferably, there are two connecting members and two sliders, and the two connecting members are respectively connected to two sliders.

Preferably, each of the two connecting members comprises a connecting member hole at the end at which the engaging member is connected, and the engaging member is simultaneously passing through the connecting member holes.

Preferably, the operating member comprises an operating member hole at an end thereof connected to the engaging member, and the connecting member passes through the operating member hole.

Preferably, the operating member comprises a recessed portion for an operators hand gripping.

Preferably, the operating member comprises an operating member hole at an end thereof connected to the engaging member, and along a transverse direction of the engaging member, the connecting member hole and the operating member hole are arranged side by side.

Preferably, the slider further includes a cover covered thereon thereby forming a cavity between the slider and the cover, and the end of the connecting member at which the slider is pivoted is located in the cavity.

Preferably, the elastic member is abutted between the connecting member and an inner wall of the cavity.

According to another solution of the application, a child safety seat is provided. The child safety seat includes: a headrest, comprising a slider fixed thereto; a backrest, the headrest being disposed on a front of the backrest, the slider being disposed on a back of the headrest, and the headrest and the slider being slidable in a longitudinal direction of the headrest; and a headrest height adjustment mechanism, wherein longitudinal sliding of the headrest and the slider in the longitudinal direction of the headrest is locked or unlocked by the headrest height adjustment mechanism.

Preferably, the backrest comprises two rows of engaging grooves distributed along the longitudinal direction of the backrest, the two rows of engaging grooves are respectively disposed on both sides in respect to a longitudinal center axis of the backrest, and opposite ends of the engaging member are locked to and unlocked from the engaging grooves.

Preferably, the backrest comprises three rows of engaging grooves distributed along a longitudinal direction of the backrest, the three rows of engaging grooves are respectively disposed on a longitudinal center axis of the backrest and on both symmetrical sides of the longitudinal center axis of the backrest, and two opposite ends of the engaging member and a and a middle part between the two opposite ends are locked to and unlocked from the engaging grooves.

Preferably, the backrest comprises a hollowed-out rail, and the slider slides along the hollowed-out rail.

The headrest height adjustment mechanism according to the application and the child safety seat comprising the headrest height adjustment mechanism are provided with an integral engaging member, and the engaging member can be pulled away from engaging grooves by pulling the engaging member in a direction away from the backrest, thereby unlocking the headrest for performing a height adjustment. Moreover, after the adjustment, by releasing of the operating member, the engaging member may be engaged to the engaging grooves again through a restoring force of the elastic member, so as to realize a positioning of the headrest. Therefore, the headrest height adjustment mechanism according to the application has a simple structure and low cost, and the adjustment operation is simple and effective with a low possibility of malfunction, and is reliable in locking.

BRIEF DESCRIPTION OF THE DRAWINGS

The accompanying drawings are included herein to provide a further understanding of the disclosure, and are incorporated into this specification to constitute a part of this specification. The accompanying drawings illustrate embodiments of the disclosure, and are used together with the following description to illustrate the concept of the disclosure.

In the drawings.

DETAILED DESCRIPTION

Hereinafter, exemplary embodiments will be described in detail with reference to the accompanying drawings. Although the disclosure is susceptible to various modifications and alternatives, specific embodiments thereof are shown by way of example in the accompanying drawings. However, the disclosure should not be construed as being limited to the embodiments set forth herein, but on the contrary, the disclosure will cover all modifications, equivalents, and alternatives that fall within the spirit and scope of the embodiments.

The headrest height adjustment mechanism 10 according to the application may be used to a variety of occasions, comprising but not limited to children's dining chairs, child safety seat, ordinary seats and the like. For the sake of brevity, the following description takes the headrest height adjustment mechanism 10 used to a child safety seat as an example.

Figure 1:
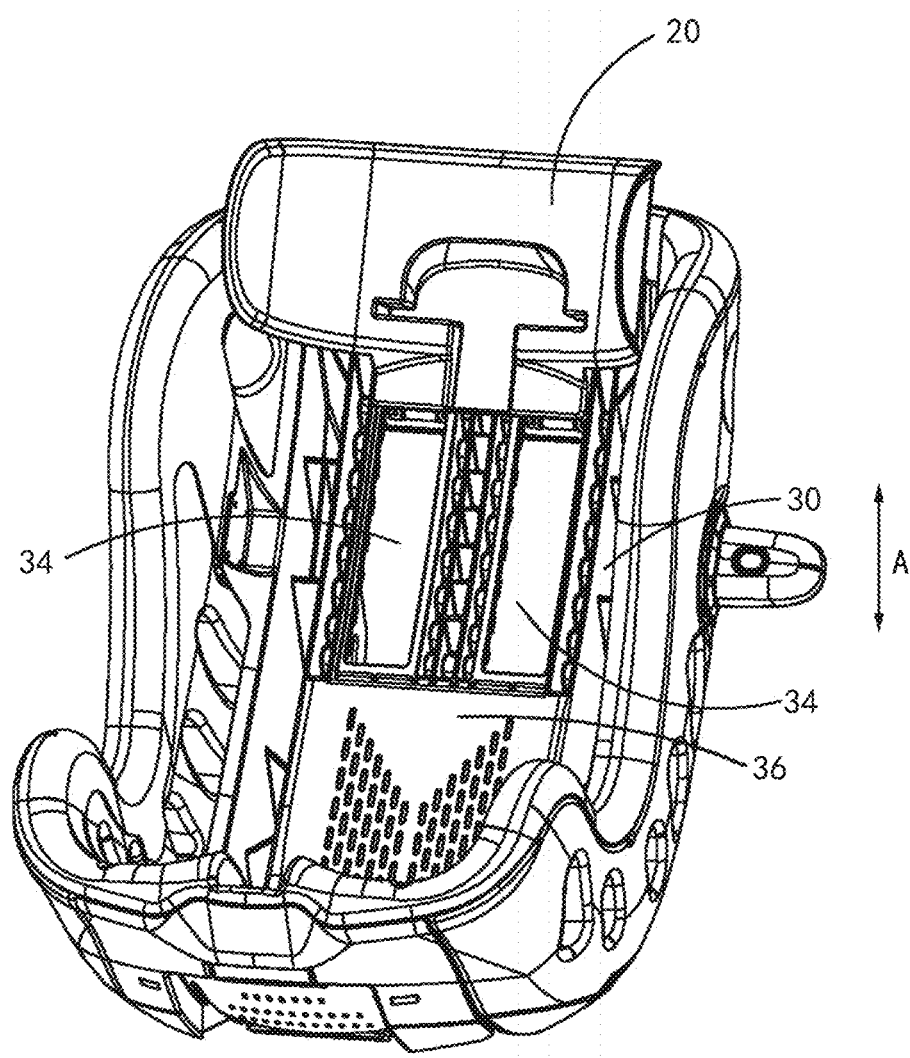
FIG. 1 is a schematic view of a front of a child safety seat according to the application.
Figure 2:
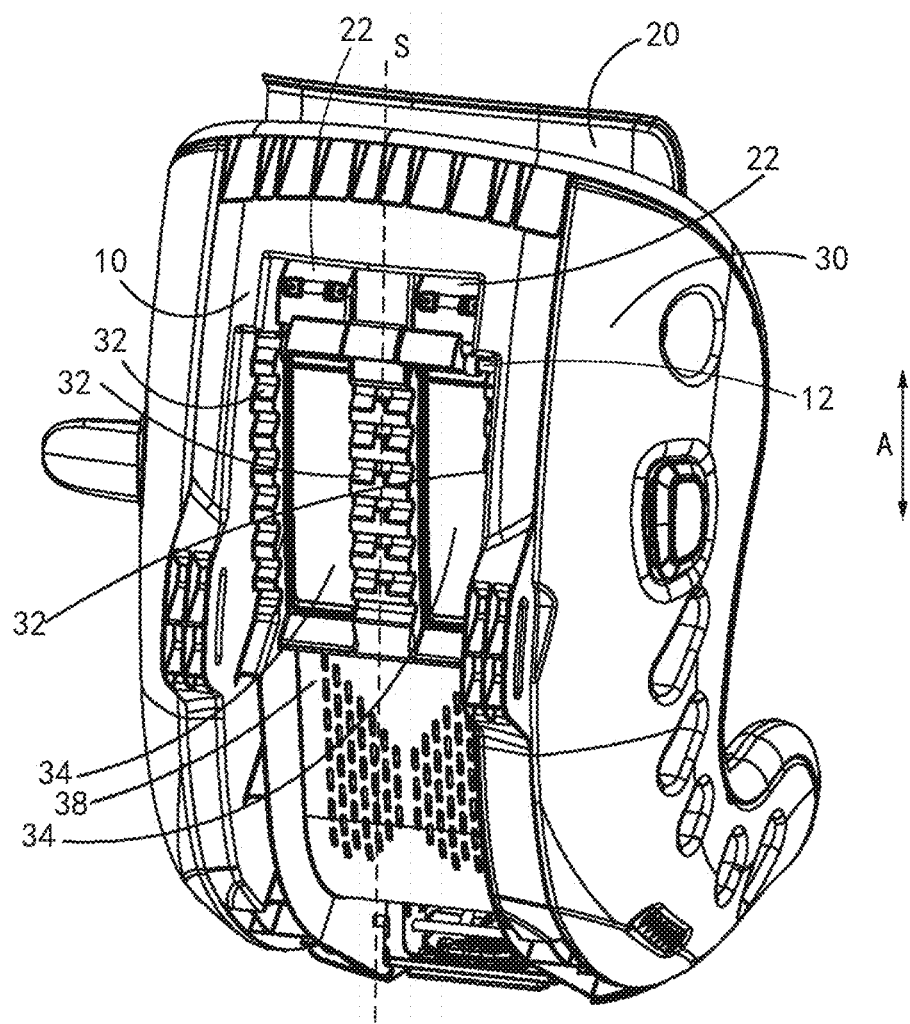
FIG. 2 is a schematic view of a back of the child safety seat according to the application.

The child safety seat can effectively improve the safety of the child in the car, usually a headrest 20 is disposed on a backrest 30 of the child safety seat to rest his/her head so as to improve the comfort of sitting. The height of the headrest 20 is required to be set differently for children of different age groups and body types, so the headrest 20 should be arranged slidable up and down along a longitudinal direction A of the backrest 30. A headrest height adjustment mechanism 10 is disposed in the child safety seat according to the application, Referring to FIGS. 1 and 2 together. FIG. 1 is a schematic view of a front 36 of the child safety seat according to the application, and FIG. 2 is a schematic view of a back 38 of the child safety seat according to the application. In the illustrated embodiment, the headrest 20 is disposed on the front 36 of the backrest 30, that is, on the side that is in contact with the child. At the same time, a slider 22 of the headrest 20 is disposed on the back 38 of the backrest 30 opposite to the front 36. The headrest 20 and its slider 22 are fixedly connected to each other as a whole, so they can slide up and down along the longitudinal direction A of the backrest 30 together.

The headrest height adjustment mechanism 10 according to the application comprises an integral engaging member 12. In this embodiment, the engaging member 12 is in a form of an integral rod, and of course, it can also be in other integral form, rather than the form of the rod. In the illustrated embodiment, the back 38 of the backrest 30 comprises three rows of engaging grooves 32 along the longitudinal direction A of the backrest 30, that is, one row of engaging grooves 32 is located on an approximate central longitudinal axis S of the backrest 30, and two rows of engaging grooves 32 are respectively located on both the opposite left and right sides of the approximate central longitudinal axis S. The number and spacing of the engaging grooves 32 in each row may be set according to the adjustment range of the headrest 20. For the stability of the sliding movement of the headrest 20 together with its slider 22, it is preferable to dispose the three rows of engaging grooves 32 as shown in FIG. 2; however, it is also possible to dispose only two rows of engaging grooves 32 opposite to each other on left and right sides, and the left and right rows of engagement grooves 32 may be symmetrical or asymmetrical with respect to the center axis of the backrest 30. If the three rows of engaging grooves 32 are disposed, two opposite ends 121, 122 of the engaging member 12 and a middle part between the two opposite ends 121, 122 can be respectively locked to the three rows of engaging grooves 32, and can be unlocked from the three rows of engaging grooves 3. If the two rows of engaging grooves 32 are disposed, the two opposite ends 121 and 122 of the engaging member 12 can be locked in the two rows of engaging grooves 32, and can be unlocked from the two rows of engaging grooves 32.

Correspondingly, if the three rows of engaging grooves 32 are disposed, then it is required to dispose two sliders 22, and two hollowed-out rails 34 are defined by the three rows of engaging grooves 32. The two sliders 22 can respectively move up and down in the longitudinal direction along the two hollowed-out rails 34, so as to link the headrest 20 to move together up and down along the longitudinal direction A of the backrest 30. Moreover, if the two rows of engaging grooves 32 are disposed, one slider 22 can be disposed, and the two rows of engaging grooves 32 define one hollowed-out rail 34 extending along the longitudinal direction A of the backrest 30. Furthermore, the one slider 22 slides up and down along the one hollowed-out rail 34, so as to link the headrest 20 also slides up and down in the longitudinal direction of the backrest 30. The hollowed-out rail(s) 34 is preferable. Such a hollowed-out rail 34 can be processed in a simple manner and can effectively reduce the overall weight of the child safety seat. Of course, other rail forms can also be adopted in the application.

Figure 3:
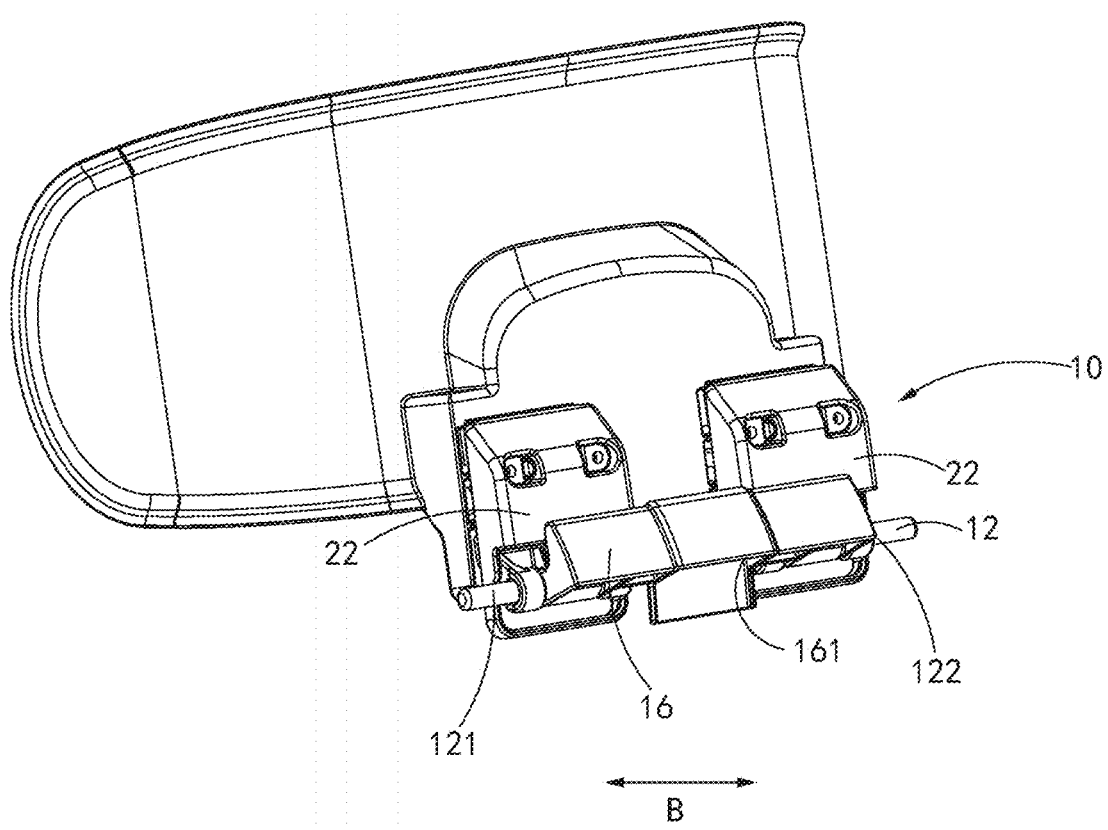
FIG. 3 is a schematic view of a headrest height adjustment mechanism for the child safety seat according to the application.
Figure 4:
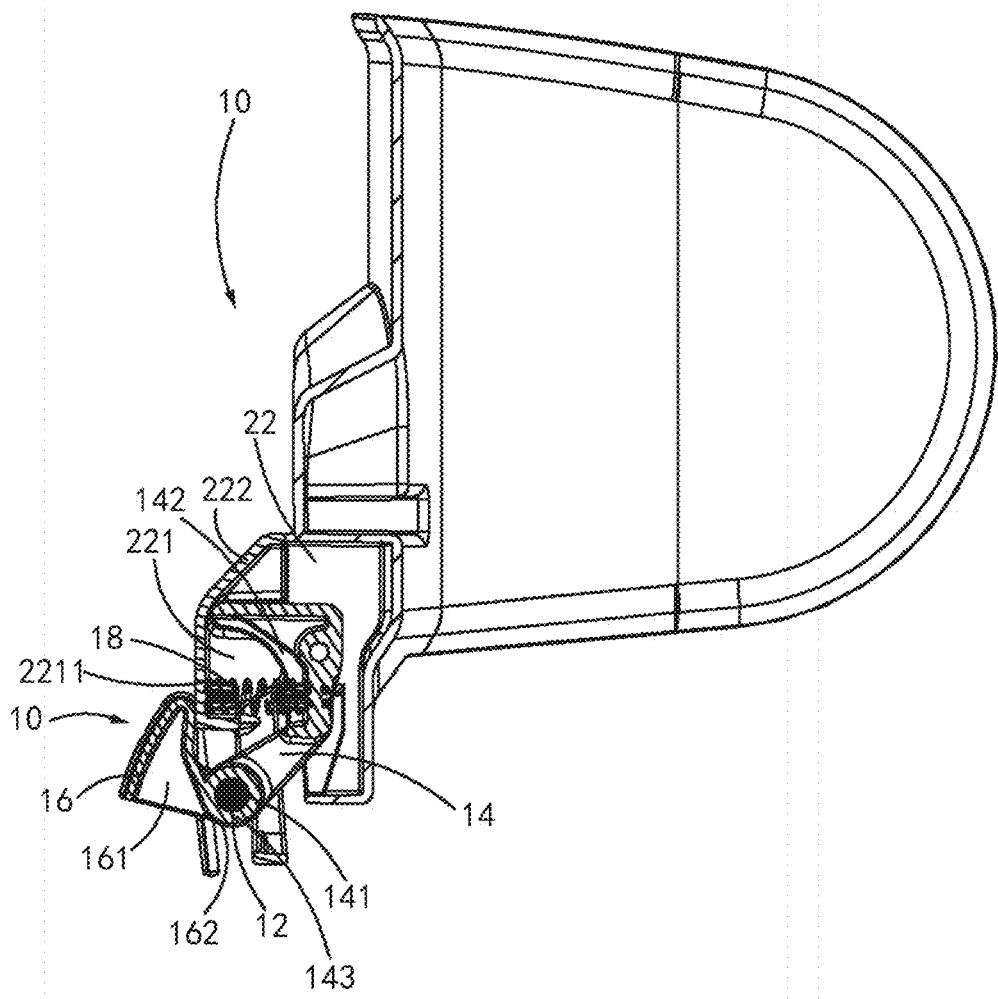
FIG. 4 is a schematic view of further showing an internal structure of the headrest height adjustment mechanism for the child safety seat according to the application.

Referring to FIGS. 3 and 4. FIG. 3 is a schematic view of the headrest height adjustment mechanism 10 for the child safety seat according to the application, and FIG. 4 is a schematic view further showing the internal structure of the headrest height adjustment mechanism 10 for the child safety seat according to the application. The headrest height adjustment mechanism 10 according to the application further includes an operating member 16. The operating member 16 is connected to the engaging member 12. Furthermore, in order to facilitate the operator's hand gripping, the operating member 16 is also provided with a recessed portion 161. The operator's fingers can be inserted into the recessed portion 161, so as to facilitate applying a force to pull the operating member 16 away from the backrest 30, and in turn, the operating member 16 brings the engaging member 12 to move outward separating away from the engaging grooves 32 of the backrest 30, thereby unlocking the headrest 20 and its slider(s) 22. At this time, the position of the headrest 20 can be adjusted up and down.

Specifically, as shown in FIG. 4, the slider(s) 22 is formed with a cavity 221. The headrest height adjustment mechanism 10 according to the application includes the integral engaging member 12, the connecting member 14, the operating member 16, and the elastic member 18. As specifically shown in FIG. 4, the connecting member 14 is approximately L-shaped as a whole, its first end 142 is located in the cavity 221 of the slider 22 and pivotally connected to the slider 22, and a second end 143 of the connecting member 14 extends outside the cavity 221 and is connected to the engaging member 12. In the illustrated embodiment, the engaging member 12 is integrally rod-shaped, and the connecting member 14 comprises a connecting member hole 141 at the end connected to the engaging member 12, i.e., the second end 143 of the connecting member 14, such that the rod-shaped engaging member 12 may pass through the connecting member hole 141. Similarly, in the illustrated embodiment, the operating member 16 is also provided with an operating member hole 162 at the end connected to the engaging member 12, such that after the engaging member 12 passing through the connecting member hole 141, the connecting member 14 together with the engaging member 12 connected thereto may pass through the operating member hole 162. That is, the engaging member 12, the connecting member 14, and the operating member 16 are successively passed through and connected at the same position. Of course, the engaging member 12, the connecting member 14, and the operating member 16 can also be connected at different positions, for example, along a transverse direction B of the engaging member 12 shown in FIG. 3, the connecting member hole 141 and the operating member hole 162 are arranged side by side. Further referring to FIG. 4, the elastic member 18 is accommodated in the cavity 221, and is abutted between the connecting member 14 and an inner wall 2211 of the cavity 221. The elastic member 18 is used to provide a restoring force when the operating member 16 is released, so as to pull the engaging member 12 to be locked into the engaging grooves 32 again.

According to the illustrated embodiment, the slider 22 is provided by two, and correspondingly, the connecting member 14 of the headrest height adjustment mechanism 10 is also provided by two. The two connecting members 14 are respectively disposed on the cavities 221 of the two sliders 22. The two connecting members 14 are respectively fixedly connected to the engaging member 12 at two positions, for example, respectively connected to a vicinity of the two opposite ends 121 and 122 of the engaging member 12. Similarly, the operating member 16 is also connected and fixed to the engaging member 12 and the connecting member 14 in the vicinity of the ends 121 and 122 of the engaging member 12. In this embodiment, the integral rod-shaped engaging member 12 withstands force evenly at the left and right ends, so the unlocking and locking processes are more stable, and the operation is more labor-saving.

In the above embodiment, the slider 22 is formed with a cavity 221. For example, as clearly shown in FIG. 4, the slider 22 is further provided with a cover 222, and the cover 222 is covered on the slider 22 to form the cavity 221 between the cover 222 and the slider 22. According to another embodiment of the application, the slider 22 may have no cavity 221 formed therein. In this case, the first end 142 of the connecting member 14 is pivotally connected to the slider 22 directly, and the elastic member 18 may be abutted between the connecting member 14 and the slider 22.

The headrest height adjustment mechanism 10 according to the application is different from the headrest height adjustment mechanism disclosed in the related art in terms of overall structure and action process, moreover, the engaging member 12 of the headrest height adjustment mechanism 10 according to the application is integral, and the moving directions of the engaging member 12 in unlocking and locking are respectively outward away from the backrest 30 and inward toward the backrest 30. In detail, when the height of the headrest 20 needs to be adjusted, the operator can pull the operating member 16 in a direction away from the backrest 30 through the recessed portion 161, such that the operating member 16 brings the connecting member 14 and the engaging member 12 together to overcome the elastic force of the elastic member 18 so as to move outward, and the engaging member 12 is separated from the engaging grooves 32, thereby unlocking the headrest 20 and its slider 22. At this time, the headrest 20 can be adjusted to the required height, and the operating member 16 may be released after adjustment. The restoring force of the elastic member 18 drives the engaging member 12 to be locked to the engaging grooves 32 again, thereby locking the headrest 20. Therefore, the headrest height adjustment mechanism 10 according to the application has a simple structure and low cost, and the adjustment operation is simple and effective with a low possibility of malfunction, and is reliable in locking.

Since the features of the disclosure can be embodied in various forms without departing from the characteristics of the disclosure, it should also be understood, the above embodiments are not limited to any details described above, unless otherwise noted; rather, it should be interpreted broadly as being within the scope defined by the appended claims. Therefore, all modifications and variations falling within the scope and limits of the claims or equivalent solutions of such scope and limits shall be covered by the appended claims.

List of reference signs:

10: Headrest Height Adjustment Mechanism
   12 Engaging Member
      121, 122 End
   14 Connecting Member
      141 Connecting Member Hole   142 First End   143 Second End
   16 Operating Member
      161 Recessed Portion   162 Operating Member Hole
   18 Elastic Member
20: Headrest
   22 Slider
      221 Cavity   222 Cover
         2211 Cavity Inner Wall
30: Backrest
   32 Engaging Grooves
   34 Hollowed-out Rail -continued List of reference signs:

36 Front
38 Back
A Longitudinal Direction
S Longitudinal Center Axis

What is claimed is:

1. A headrest height adjustment mechanism connected to a slider fixed to a headrest, the headrest height adjustment mechanism comprising:
    an integral engaging member, positioning the headrest;
    a connecting member, comprising a first end pivotally connected to the slider, and a second end connected to the engaging member;
    an operating member, connected to the engaging member to operate the engaging member; and
    an elastic member, abutted between the connecting member and the slider,
    wherein
    the operating member is configured to move with the engaging member in an up and down direction to adjust a height of the headrest, and
    the operating member includes a recessed portion for hand gripping.

2. The headrest height adjustment mechanism according to claim 1, wherein the engaging member is integral rod-shaped.

3. The headrest height adjustment mechanism according to claim 1, wherein
    there are two connecting members and two sliders, and
    the two connecting members are respectively connected to the two sliders.

4. The headrest height adjustment mechanism according to claim 3, wherein
    each of the two connecting members comprises a connecting member hole at the second end, and
    the engaging member simultaneously passes through the connecting member holes.

5. The headrest height adjustment mechanism according to claim 4, wherein
    the operating member comprises an operating member hole at an end thereof connected to the engaging member, and
    each of the connecting members passes through the operating member hole.

6. The headrest height adjustment mechanism according to claim 4, wherein
    the operating member comprises an operating member hole at an end thereof connected to the engaging member, and
    each of the connecting member holes and the operating member hole are arranged side by side along a transverse direction of the engaging member.

7. The headrest height adjustment mechanism according to claim 1, wherein
    the connecting member comprises a connecting member hole at the second end, and
    the engaging member passes through the connecting member hole.

8. The headrest height adjustment mechanism according to claim 7, wherein
    the operating member comprises an operating member hole at an end thereof connected to the engaging member, and
    the connecting member hole and the operating member hole are arranged side by side along a transverse direction of the engaging member.

9. The headrest height adjustment mechanism according to claim 1, wherein
    the slider further comprises a cover covered thereon thereby forming a cavity between the slider and the cover, and
    the first end is located in the cavity.

10. The headrest height adjustment mechanism according to claim 9, wherein the elastic member is abutted between the connecting member and an inner wall of the cavity.

11. A child safety seat, comprising:
    a headrest, comprising a slider fixed thereto;
    a backrest, the headrest being disposed on a front of the backrest, the slider being disposed on a back of the backrest, and the headrest and the slider being slidable in a longitudinal direction of the backrest; and
    the headrest height adjustment mechanism according to claim 1, wherein longitudinal sliding of the headrest and the slider in the longitudinal direction of the backrest is configured to be locked or unlocked by the headrest height adjustment mechanism.

12. The child safety seat according to claim 11, wherein
    the backrest comprises two rows of engaging grooves distributed along the longitudinal direction of the backrest,
    the two rows of engaging grooves are respectively disposed on both sides in respect to a longitudinal center axis of the backrest, and
    opposite ends of the engaging member are configured to be locked to and unlocked from the engaging grooves.

13. The child safety seat according to claim 11, wherein
    the backrest comprises three rows of engaging grooves distributed along the longitudinal direction of the backrest,
    the three rows of engaging grooves are respectively disposed on a longitudinal center axis of the backrest and on both symmetrical sides of the longitudinal center axis of the backrest, and
    two opposite ends of the engaging member and a middle part between the two opposite ends are configured to be locked to and unlocked from the engaging grooves.

14. The child safety seat according to claim 11, wherein the backrest comprises a hollowed-out rail, and
    the slider is configured to slide along the hollowed-out rail.

* * * * *